(12) United States Patent
Cui et al.

(10) Patent No.: US 11,560,161 B2
(45) Date of Patent: Jan. 24, 2023

(54) RAILWAY VEHICLE, COUPLER, AND COUPLER BODY THEREOF

(71) Applicant: CRRC QIQIHAR ROLLING STOCK CO., LTD., Heilongjiang (CN)

(72) Inventors: Yingjun Cui, Heilongjiang (CN); Yan Jiang, Heilongjiang (CN); Pengdi Jin, Heilongjiang (CN); Yan Wang, Heilongjiang (CN); Changchun Wang, Heilongjiang (CN); Qingmin Meng, Heilongjiang (CN)

(73) Assignee: CRRC QIQIHAR ROLLING STOCK CO., LTD., Heilongjiang (CN)

( * ) Notice: Subject to any disclaimer, the term of this patent is extended or adjusted under 35 U.S.C. 154(b) by 117 days.

(21) Appl. No.: 16/975,832

(22) PCT Filed: Jun. 26, 2019

(86) PCT No.: PCT/CN2019/092974
§ 371 (c)(1),
(2) Date: Aug. 26, 2020

(87) PCT Pub. No.: WO2020/001469
PCT Pub. Date: Jan. 20, 2020

(65) Prior Publication Data
US 2020/0406940 A1 Dec. 31, 2020

(30) Foreign Application Priority Data

Jun. 29, 2018 (CN) .......................... 201810700562.5
Jun. 29, 2018 (CN) .......................... 201821029251.2

(51) Int. Cl.
*B61G 1/36* (2006.01)
*B61G 3/06* (2006.01)

(52) U.S. Cl.
CPC ................. *B61G 1/36* (2013.01); *B61G 3/06* (2013.01)

(58) Field of Classification Search
CPC .................................... B61G 1/36; B61G 3/06
See application file for complete search history.

(56) References Cited

U.S. PATENT DOCUMENTS 4,206,849 A 6/1980 Kaim
4,976,363 A * 12/1990 Altherr .................... B61G 3/06
213/155

(Continued)

FOREIGN PATENT DOCUMENTS

CN 102159348 A 8/2011
CN 201999008 U 10/2011

(Continued)

OTHER PUBLICATIONS

Application and File history for U.S. Appl. No. 16/975,897, filed Aug. 26, 2020. Inventors: Meng et al. et al.

(Continued)

*Primary Examiner* — Ryan J. Walters
(74) *Attorney, Agent, or Firm* — Patterson Thuente, P.A.

(57) ABSTRACT

A railway vehicle, a coupler, and a coupler body thereof. The coupler body comprises an upper traction platform, a lower traction platform, a lock chamber, and a pin hole. A traction surface of an upper traction platform and/or a lower traction platform is divided into a contact area and a yielding area along the direction approaching the lock chamber, an extension face of the end of the contact area close to the lock (Continued)

chamber is an M2 face, and the yielding area is positioned at the side of the M2 face close to the pin hole. The yielding area is positioned on the side of the contact area next to the lock chamber and there is a gap and no contact between the yielding area and a traction platform of a coupler knuckle.

9 Claims, 6 Drawing Sheets

(56) References Cited

U.S. PATENT DOCUMENTS

| | | | | |
|---|---|---|---|---|
| 7,497,345 | B2* | 3/2009 | Brabb | B61G 3/08 213/154 |
| 8,201,613 | B2* | 6/2012 | Marchese | B61G 3/04 164/137 |
| 8,220,175 | B2* | 7/2012 | Saeler | B61G 7/14 33/651 |
| 8,646,631 | B2* | 2/2014 | Marchese | B61G 3/04 213/137 |
| 8,714,378 | B2* | 5/2014 | Maxeiner | B61G 3/04 213/151 |
| 9,199,652 | B1 | 12/2015 | Brook | |
| 9,701,323 | B2* | 7/2017 | Manibharathi | B61G 3/08 |
| 9,707,980 | B2* | 7/2017 | Mautino | B61G 3/06 |
| 2009/0289023 | A1 | 11/2009 | Marchese et al. | |
| 2011/0197461 | A1 | 8/2011 | Saeler | |
| 2011/0266242 | A1 | 11/2011 | Maxeiner et al. | |
| 2013/0206716 | A1 | 8/2013 | Burgoyne et al. | |
| 2015/0375762 | A1 | 12/2015 | Mautino et al. | |
| 2016/0288806 | A1 | 10/2016 | Manibharathi et al. | |
| 2020/0198670 | A1* | 6/2020 | Todt | B61G 3/04 |
| 2021/0001899 | A1 | 1/2021 | Meng et al. | |

FOREIGN PATENT DOCUMENTS

| | | |
|---|---|---|
| CN | 204548148 U | 8/2015 |
| CN | 105109513 A | 12/2015 |
| CN | 107873007 A | 4/2018 |
| CN | 108528471 A | 9/2018 |
| CN | 108583612 A | 9/2018 |
| CN | 108839666 A | 11/2018 |
| CN | 208453007 U | 2/2019 |
| CN | 20858249 U | 3/2019 |
| WO | WO-2009003159 A1 | 12/2008 |
| WO | WO 2009/142750 A1 | 11/2009 |
| WO | WO-2019142750 A1 | 7/2019 |

OTHER PUBLICATIONS

First Office Action for Chinese Application No. 201810701432.3, dated Apr. 3, 2019, 9 pages.
International Search Report with English translation for PCT/CN2019/092973, dated Sep. 26, 2019, 13 pages.
Examination Report dated May 3, 2021 for Australian Application No. 2019296794, 4 pages.
International Search Report with English translation for PCT/CN2019/092974, dated Sep. 27, 2019, 13 pages.
Examination Report dated May 4, 2021 for Australian Application No. 2019296795, 4 pages.

* cited by examiner

RAILWAY VEHICLE, COUPLER, AND COUPLER BODY THEREOF

FIELD

The present application is the national phase of international application No. PCT/CN2019/092974, titled "RAILWAY VEHICLE, COUPLER AND COUPLER BODY THEREOF", filed on Jun. 26, 2019, which claims the priority to Chinese Patent Applications No. 201810700562.5 and No. 201821029251.2, both titled "RAILWAY VEHICLE, COUPLER, AND COUPLER BODY THEREOF", both filed with the China National Intellectual Property Administration on Jun. 29, 2018, which are incorporated herein by reference.

FIELD

The present application relates to the technical field of railway transportation, and in particular to a railway vehicle, a coupler and a coupler body thereof.

BACKGROUND

Figure 1:
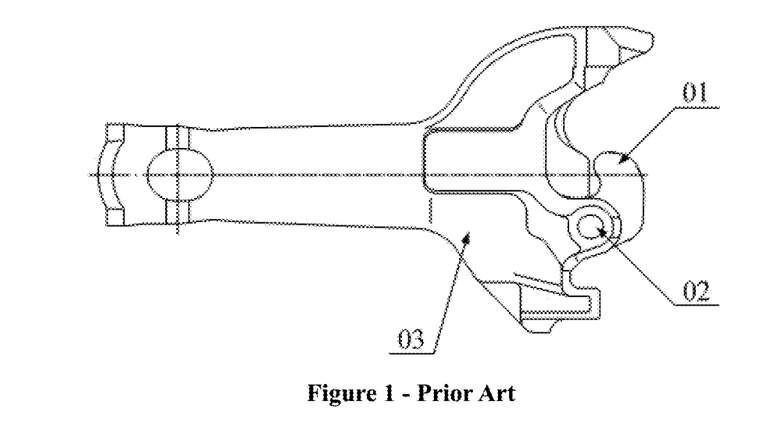
FIG. 1 is a schematic structural view of a single coupler in the prior art.
Figure 2:
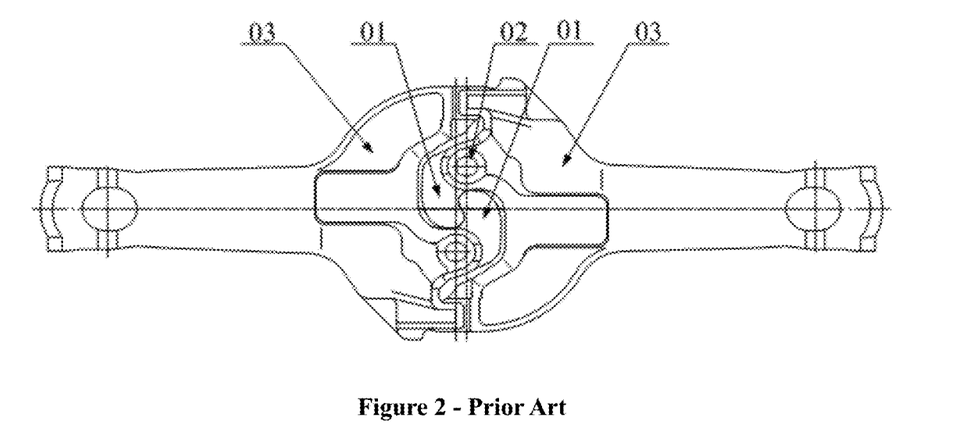
FIG. 2 is a schematic view showing two couplers in a hitched state in the prior art.

The coupler is one of the most basic and most important parts of the railway vehicle. It is installed at two ends of the vehicle and is used to connect two adjacent vehicles and transmit the longitudinal force of the train. There are many kinds of couplers, but the most widely used coupler is articulated coupler. As shown in FIG. 1, an articulated coupler includes a coupler body 03, a coupler knuckle 01, a coupler lock, a coupler knuckle push member, a coupler knuckle pin 02 and other components. The coupler knuckle 01 is rotatable around the coupler knuckle pin 02 to realize opening and locking of the coupler. The main load-bearing parts inside the coupler are a traction platform of the coupler knuckle 01 and a traction platform of the coupler body 03. As shown in FIG. 2, two couplers are hitched to connect two adjacent vehicles.

Figure 3:
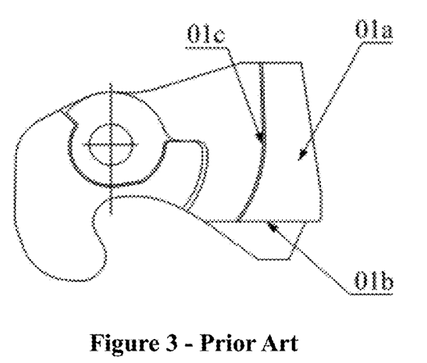
FIG. 3 is a top view of a coupler knuckle in the prior art.
Figure 4:
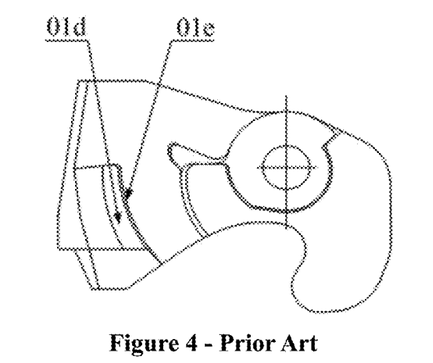
FIG. 4 is a bottom view of the coupler knuckle in the prior art.
Figure 5:
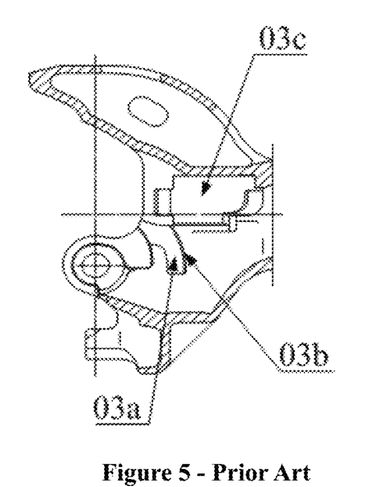
FIG. 5 is a sectional view of a coupler body in the prior art.
Figure 6:
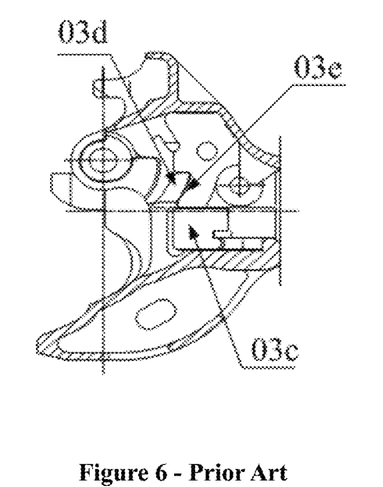
FIG. 6 is another sectional view of the coupler body in the prior art.
Figure 7:
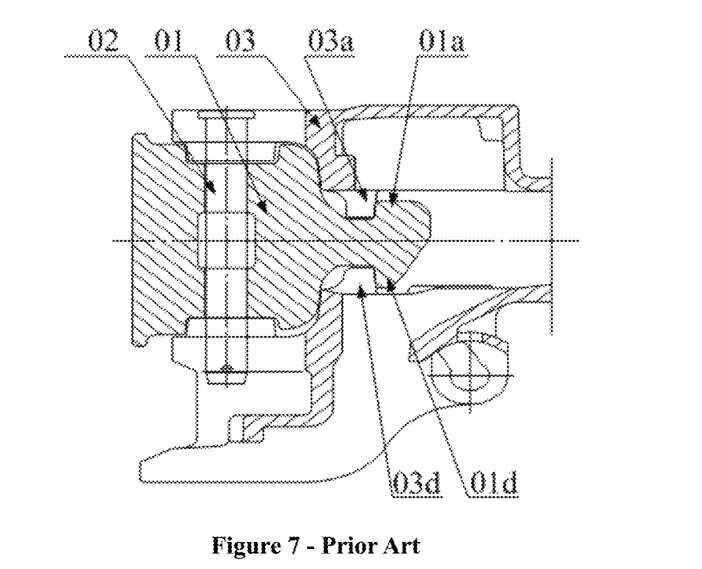
FIG. 7 is a sectional view showing the engagement of the coupler knuckle and the coupler body in the prior art.

At present, the fracture of the coupler mainly occurs under the tensile working condition. The main load-bearing parts of the coupler are the traction platform of the coupler knuckle 01 and the traction platform of the coupler body 03. As shown in FIGS. 3 and 4, the coupler knuckle 01 is provided with an upper traction platform, a lower traction platform and a lock surface 01b. As shown in FIGS. 5 and 6, the coupler body is provided with an upper traction platform, a lower traction platform and a lock chamber 03c. As shown in FIG. 7, when the coupler knuckle is engaged with the coupler body, the upper traction platform 01a of the coupler knuckle abuts against the upper traction platform 03a of the coupler body, the lower traction platform 01d of the coupler knuckle abuts against the lower traction platform 03e of the coupler body, and then an upper traction surface 01c of the coupler knuckle contacts and abuts against an upper traction surface 03b of the coupler body, and a lower traction surface 01e of the coupler knuckle contacts and abuts against the lower traction surface 03e of the coupler body to realize load bearing. When the coupler lock is in contact with the lock surface 01b of the coupler knuckle 01, the coupler lock can restrict the coupler knuckle 01 from rotating around the coupler knuckle pin 02 to cause the coupler to be in a locked state. When the coupler lock is moved into the lock chamber 03c, the coupler knuckle 01 can rotate around the coupler knuckle pin 02 to cause the coupler to be in an unlocked state.

It can be seen from FIGS. 5 and 6 that the upper traction platform 03a and the lower traction platform 03e of the coupler body are closer to the lock chamber 03c. After the coupler knuckle 01 is engaged and connected with the coupler body 03, the structure changes abruptly at edges, close to the lock chamber 03c, of the contact area between the upper traction platform 01a of the coupler knuckle and the upper traction platform 03a of the coupler body and the contact area between the lower traction platform 01d of the coupler knuckle and the lower traction platform 03d of the coupler body. As a result, the stress is more concentrated at the roots of the upper and lower traction platforms of the coupler body close to the lock surface, which easily causes the roots of the upper and lower traction platforms of the coupler body to break, reduces the service life of the coupler body, increases the replacement and maintenance cost of the coupler, and affects the running safety of the train.

In summary, how to effectively prolong the service life of the coupler body and reduce the maintenance cost of the coupler is an urgent problem to be solved by those skilled in the art.

SUMMARY

In view of this, the first object of the present application is to provide a coupler body whose structural design can effectively prolong the service life of the coupler body and reduce the maintenance cost of the coupler. The second object of the present application is to provide a coupler including the coupler body and a railway vehicle including the coupler.

In order to achieve the first object, the following technical solutions are provided according to the present application.

A coupler body includes an upper traction platform, a lower traction platform, a lock chamber and a pin hole. A traction surface of the upper traction platform and/or the lower traction platform is divided into a contact area and an avoidance area along a direction of approaching the lock chamber, an extension surface of one end of the contact area close to the lock chamber is defined as M2, and the avoidance area is located on one side of the M2 surface close to the pin hole.

Preferably, in the coupler body, a first end of the avoidance area is connected with the contact area and a second end of the avoidance area is far away from the contact area. The direction from left to right and perpendicular to the axis of the pin hole is defined as the first extension direction. The front side of the coupler body is used for engaging with a coupler knuckle. An extension distance from the first end to the second end of the avoidance area along the first extension direction is defined as L2, and 60 mm>L2>10 mm.

Preferably, in the coupler body, the contact area is a curved surface.

Preferably, in the coupler body, the contact area is an arc surface and protrudes away from the pin hole.

Preferably, in the coupler body, the avoidance area is specifically an inner wall of a groove provided on the traction surface of the upper traction platform and/or the lower traction platform.

Preferably, in the coupler body, the avoidance area is a curved surface.

Preferably, in the coupler body, each traction surface of the upper traction platform and the lower traction platform is divided into the contact area and the avoidance area along the direction of approaching the lock chamber, an extension surface of one end of the contact area close to the lock chamber is defined as M2, and the avoidance area is located on one side of the M2 surface close to the pin hole; and the avoidance area of the upper traction platform and the avoidance area of the lower traction platform are symmetrically arranged.

Preferably, in the coupler body, the coupler knuckle is cut along a vertical plane perpendicular to a tangent plane of an impact surface of an upper impact platform or along a vertical plane perpendicular to a tangent plane of a traction surface of an upper pin-protecting flange of the coupler body to obtain a section I of the impact surface of the upper impact platform and a section J of the impact surface of the upper pin-protecting flange, wherein the minimum horizontal distance between the section I and the section J is defined as f, and 15 mm≤f≤30 mm; and/or, the coupler knuckle is cut along a vertical plane perpendicular to a tangent plane of an impact surface of a lower impact platform or along a vertical plane perpendicular to a tangent plane of a traction surface of a lower pin-protecting flange of the coupler body to obtain a section K of the impact surface of the lower impact platform and a section M of the impact surface of the lower pin-protecting flange, wherein the minimum horizontal distance between the section K and the section M is defined as g, and 15 mm≤g≤30 mm.

Preferably, in the coupler body, the coupler knuckle is cut along a vertical plane perpendicular to a tangent plane of the inner wall of the pin hole or along a vertical plane perpendicular to the tangent plane of the traction surface of the upper pin-protecting flange to obtain a section N of the inner wall of the pin hole and a section O of the impact surface of the upper pin-protecting flange, wherein the minimum horizontal distance between the section N and the section O is defined as h, and 15 mm≤h≤30 mm; and/or, the coupler knuckle is cut along a vertical plane perpendicular to the tangent plane of the inner wall of the pin hole or along a vertical plane perpendicular to the tangent plane of the traction surface of the lower pin-protecting flange to obtain a section P of the inner wall of the pin hole and a section Q of the impact surface of the lower pin-protecting flange, wherein the minimum horizontal distance between the section P and the section Q is defined as i, and 15 mm≤i≤30 mm.

A coupler includes a coupler knuckle and a coupler body, wherein the coupler body is the coupler body described in any one of the above.

A railway vehicle includes a coupler, and the coupler is the coupler as described above.

When the coupler body provided by the present application is engaged with the coupler knuckle, the traction surface of the upper traction platform of the coupler body contacts and abuts against the traction surface of the upper traction platform of the coupler knuckle, and the traction surface of the lower traction platform of the coupler body contacts and abuts against the traction surface of the lower traction platform of the coupler knuckle, and the traction platform of the coupler body is located at one side of the corresponding traction platform of the coupler knuckle close to the pin hole. As the upper traction platform and/or the lower traction platform of the coupler body is provided with the avoidance area which is located at one side of the extension surface of the contact area close to the pin hole, a gap is provided between the avoidance area of the traction surface of the upper traction platform and/or the lower traction platform of the coupler body and the traction surface of the corresponding traction platform of the coupler knuckle, and the avoidance area and the traction surface of the corresponding traction platform of the coupler knuckle cannot contact each other, when the coupler body provided by the embodiment of the present application is engaged with the coupler knuckle. Meanwhile, the contact area of the traction surface of the upper traction platform and/or the lower traction platform of the coupler body and the traction surface of the corresponding traction platform of the coupler knuckle are in close contact with each other without a gap.

With this arrangement, since the avoidance area is located at one side of the contact area close to the lock chamber and a gap is provided between the avoidance area and the traction platform of the coupler knuckle and the two are not in contact with each other, the distance from the edge of the contact area between the upper traction platform and/or the lower traction platform of the coupler body and the traction platform of the coupler knuckle to the lock chamber is increased, and the distance from the engagement contact bearing position of the coupler body and the coupler knuckle to the lock chamber and the lock surface is increased, so that the engagement contact bearing position of the coupler body and the coupler knuckle gets away from the structural abrupt change area, thereby reducing the stress level of the upper and lower traction platforms of the coupler body and the coupler knuckle, avoiding the problem that the traction platforms of the coupler body and the coupler knuckle break prematurely, prolonging the service life of the coupler body and the coupler knuckle, and reducing the maintenance cost of the coupler.

In order to achieve the second object, a coupler and a railway vehicle are further provided according to the present application. The coupler includes a coupler knuckle and a coupler body, wherein the coupler body is any one of the coupler bodies mentioned above, and the railway vehicle includes the coupler, so the coupler and the railway vehicle should also have corresponding technical effects.

BRIEF DESCRIPTION OF THE DRAWINGS

For more clearly illustrating embodiments of the present application or technical solutions in the conventional technology, the drawing referred to for describing the embodiments or the conventional technology will be briefly described hereinafter. Apparently, the drawings in the following description are only some examples of the present application, and for those skilled in the art, other drawings may be obtained based on the provided drawings without any creative efforts.

Reference Numerals in FIGS. 1 to 7 are listed as follows:
01 coupler knuckle,
01a upper traction platform of the coupler knuckle,
01b lock surface,
01c upper traction surface of the coupler knuckle,
01d lower traction platform of the coupler knuckle,
01e lower traction surface of the coupler knuckle,
02 coupler knuckle pin,
03 coupler body,
03a upper traction platform of the coupler body,
03b upper traction surface of the coupler body,
03c lock chamber,
03d lower traction platform of the coupler body,
03e lower traction surface of the coupler body;

Reference numerals in FIGS. 8 to 14 are listed as follows:
201 upper traction platform of the coupler body,
202 upper impact surface of the coupler body,
203 upper pin-protecting flange of the coupler body,
205 lower traction platform of the coupler body,
211a contact area,
211b avoidance area,
204 pin hole of the coupler body,
205 lower traction platform of the coupler body,
206 lower impact surface of the coupler body,
207 lower pin-protecting flange of the coupler body,
209 lock chamber;
101 upper traction platform of the coupler knuckle,
102 neck portion,
108 lower traction platform of the coupler knuckle,
116 coupler knuckle pin.

DETAILED DESCRIPTION OF EMBODIMENTS

The first object of the present application is to provide a coupler body whose structural design can effectively prolong the service life of the coupler body and reduce the maintenance cost of the coupler. The second object of the present application is to provide a coupler including the coupler body and a railway vehicle including the coupler.

The technical solutions in the embodiments of the present application will be described clearly and completely hereinafter in conjunction with the drawings in the embodiments of the present application. The described embodiments are only a part of the embodiments of the present application, rather than all embodiments. Based on the embodiments in the present application, all of other embodiments, made by the person skilled in the art without any creative efforts, fall into the scope of the present application.

In the description of the present application, it should be understood that an orientation or a position relation indicated by terms "upper", "lower", "front", "rear", "left", "right" or the like is described based on an orientation or a position relation shown in the drawings, and is only used for describing the present application and simplifying the description, rather than instructing or implying that a device or element related to the terms must have a specific orientation or be constructed and operated in a specific orientation. Therefore, the terms should be not construed as limitations of the present application. In addition, the terms "first", "second" and the like are for purpose of description, and should not be construed as indicating or implying relative importance.

Figure 8:
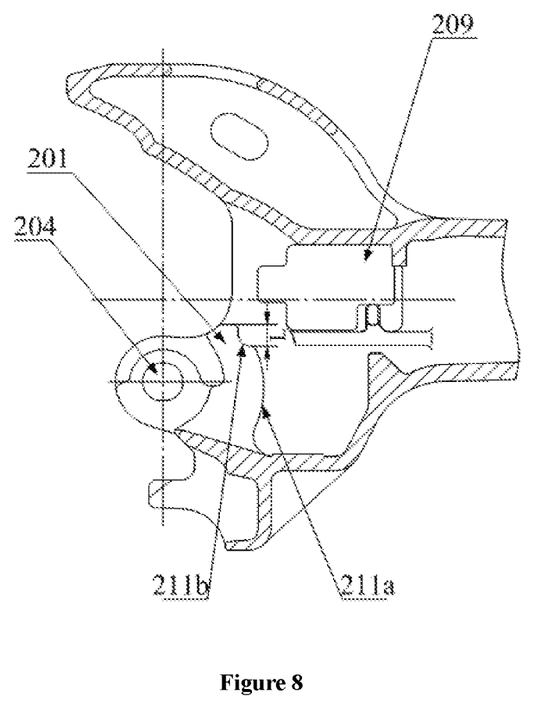
FIG. 8 is a sectional view of a coupler body provided in an embodiment of the present application.
Figure 9:
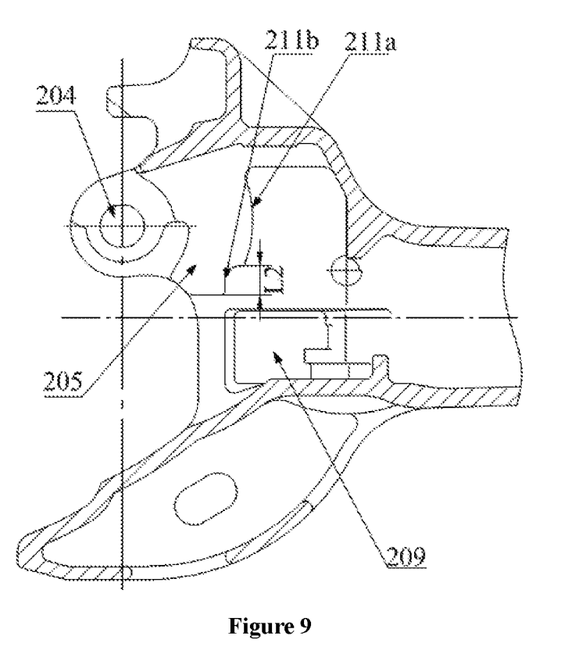
FIG. 9 is another sectional view of the coupler body provided in an embodiment of the present application.
Figure 10:
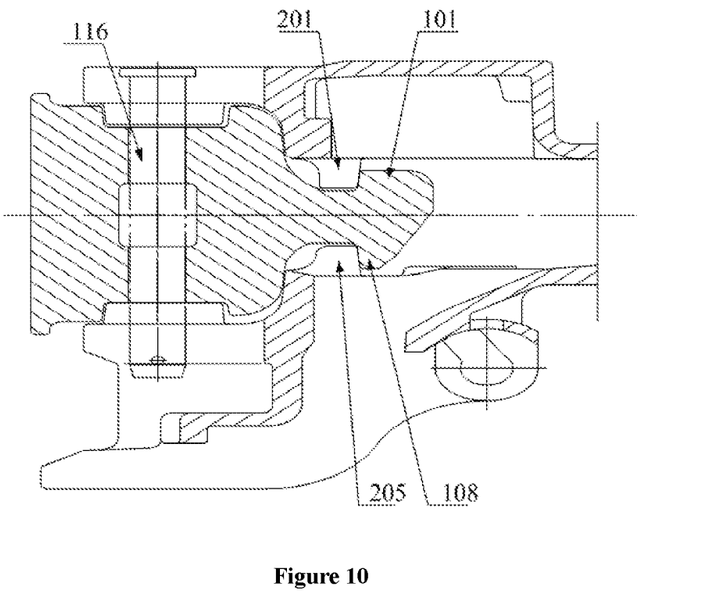
FIG. 10 is a sectional view of a contact area provided by an embodiment of the present application.
Figure 11:
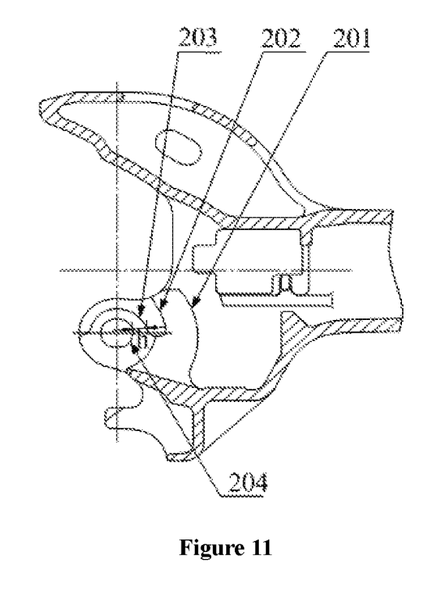
FIG. 11 is a sectional view of the coupler body provided by another embodiment of the present application.
Figure 12:
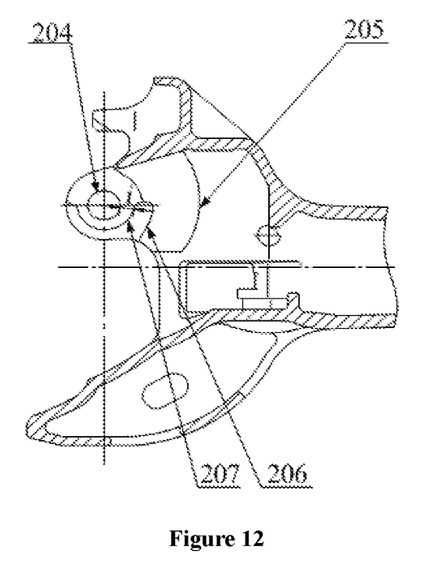
FIG. 12 is another sectional view of the coupler body provided by another embodiment of the present application.

Referring to FIGS. 8 to 10, the coupler body provided by the embodiment of the present application includes an upper traction platform 201, a lower traction platform 205, a lock chamber 209 and a pin hole 204, wherein the lock chamber 209 is configured to accommodate a coupler lock to enable a coupler knuckle to rotate around a coupler knuckle pin 116, and the pin hole 204 is configured to allow the coupler knuckle pin 116 to pass through. The point is that a traction surface of the upper traction platform 201 and/or the lower traction platform 205 is divided into a contact area 211a and an avoidance area 211b along a direction of gradually approaching the lock chamber 209. That is, the traction surface of at least one of the upper traction platform 201 and the lower traction platform 205 is divided into the contact area 211a and the avoidance area 211b, and the avoidance area 211b is closer to the lock chamber 209 than the contact area 211a, that is, the traction surface is sequentially divided into the contact area 211a and the avoidance area 211b along the direction of gradually approaching the lock chamber 209.

In addition, an extension surface of one end of the contact area 211a close to the lock chamber 209 is defined as M2, and the avoidance area 211b is located on one side of the M2 surface close to the pin hole 204. If a first end of the contact area 211a is connected with the avoidance area 211b, the M2 surface is the extension surface of the first end of the contact area 211a, and the avoidance area 211b is located between the M2 surface and the pin hole 204. When the coupler body is in normal use, a section of the M2 surface, a section of the contact area 211a and a section of the avoidance area 211b are obtained by taking a cross section view by cutting the coupler body along the horizontal plane. The section of the M2 surface is an extension line of the section of the contact area 211a, and the section of the avoidance area 211b is located between the section of the M2 surface and a section of the pin hole 204.

It should be noted that the above-mentioned pin hole 204 and the lock chamber 209 are the same as those of the coupler body in the prior art. The pin hole 204 is located at the front side of the coupler body, and the front side of the coupler body is configured to engage with the coupler knuckle.

When the coupler body provided by the embodiment of the present application is engaged with the coupler knuckle, the traction surface of the upper traction platform 201 of the coupler body contacts and abuts against the traction surface of an upper traction platform 101 of the coupler knuckle, and the traction surface of the lower traction platform 205 of the coupler body contacts and abuts against the traction surface of a lower traction platform 108 of the coupler knuckle, and the traction platform of the coupler body is located at one side of the corresponding traction platform of the coupler knuckle close to the pin hole 204. As the upper traction platform 201 and/or the lower traction platform 205 of the coupler body is provided with the avoidance area 211b which is located at one side of the extension surface of the contact area 211a close to the pin hole 204, a gap is provided between the avoidance area 211b of the traction surface of the upper traction platform 201 and/or the lower traction platform 205 of the coupler body and the traction surface of the corresponding traction platform of the coupler knuckle, and the avoidance area and the traction surface of the corresponding traction platform of the coupler knuckle cannot contact each other, when the coupler body provided by the embodiment of the present application is engaged with the coupler knuckle. Meanwhile, the contact area 211a of the traction surface of the upper traction platform 201 and/or the lower traction platform 205 of the coupler body and the traction surface of the corresponding traction platform of the coupler knuckle are in close contact with each other without a gap.

With this arrangement, since the avoidance area 211b is located at one side of the contact area 221a close to the lock chamber 209 and a gap is provided between the avoidance area 211b and the traction platform of the coupler knuckle and the two are not in contact with each other, the distance from the edge of the contact area between the upper traction platform 201 and/or the lower traction platform 205 of the coupler body and the traction platform of the coupler knuckle to the lock chamber 209 is increased, and the distance from the engagement contact bearing position of the coupler body and the coupler knuckle to the lock chamber 209 and the lock surface is increased, so that the engagement contact bearing position of the coupler body and the coupler knuckle gets away from the structural abrupt change area, thereby reducing the stress level of the upper and lower traction platforms of the coupler body and the coupler knuckle, avoiding the problem that the traction platforms of the coupler body and the coupler knuckle break prematurely, prolonging the service life of the coupler body and the coupler knuckle, and reducing the maintenance cost of the coupler.

In a specific embodiment, the first end of the avoidance area 211b is connected with the contact area 211a and the second end of the avoidance area is away from the contact area, that is, two ends of the avoidance area 211b are respectively defined as the first end and the second end along the direction of approaching the lock chamber 209, wherein the first end is connected with the contact area 211a, and the second end is farther away from the contact area 211a than the first end. The front side of the coupler body is configured to engage with the coupler knuckle, and the rear side of the coupler body is configured to engage and connect with the vehicle. When the coupler body is in normal use, the left and right sides of the coupler body coincide with the left and right sides of the vehicle, that is, the coupler body is perpendicular to the traveling direction of the vehicle along the direction from left to right. The direction from left to right and perpendicular to the axis of the pin hole is defined as the first extension direction of the coupler body. An extension distance from the first end to the second end of the avoidance area 211b along the first extension direction is defined as L2, and 60 mm>L2>10 mm. In this way, it is ensured that the distance from the engagement contact bearing position of the coupler body and the coupler knuckle to the lock chamber 209 is greater than 10 mm and less than 60 mm, the distance may be, for example, 12 mm, 15 mm and so on, thus effectively reducing the stress of the traction platforms of the coupler body. Specifically, extension distances from different positions of the first end of the avoidance area 211b to different positions of the second end along the first extension direction are all L2.

Apparently, the extension distance L2 from the first end to the second end of the avoidance area 211b along the first extension direction may be other values according to the actual situation, which is not limited here.

In order to prevent dislocation when the coupler body is engaged with the coupler knuckle, the contact area 211a may be a curved surface, and similarly, the area, cooperating with the contact area, on the traction surface of the traction platform of the coupler knuckle may be a curved surface as well. The coupler body and the coupler knuckle can be prevented from sliding relative to each other and from shifting and dislocation.

In addition, the contact area 211a may be an arc surface. Specifically, the contact area 211a may protrude away from the pin hole 204, or the contact area 211a may protrude toward the pin hole 204, which is not limited here.

The contact area 211a may be other types of curved surfaces, such as a part of a sphere, or the contact area 211a may be a plane.

In an embodiment, the avoidance area 211b is specifically an inner wall of a groove provided on the traction surface of the upper traction platform 201 and/or the lower traction platform 205. In this way, it is applicable by directly providing a groove on the traction surface of the upper traction platform 201 and/or the lower traction platform 205, and the operation is simpler and more convenient.

In another specific embodiment, the avoidance area 211b may be a curved surface. Since the avoidance area 211b does not contact with the traction platform of the coupler knuckle, the avoidance area 211b may be of any shape as long as a gap is provided between the avoidance area 211b and the traction platform of the coupler knuckle after the coupler body is engaged with the coupler knuckle.

Apparently, the avoidance area 211b may be an arc surface or a plane, which is not limited here.

In a preferred embodiment, each traction surface of the upper traction platform 201 and the lower traction platform 205 of the coupler body is divided into the contact area 211a and the avoidance area 211b along the direction of approaching the lock chamber 209, that is, the traction surface of the upper traction platform 201 of the coupler body has the contact area 211a and the avoidance area 211b, and the traction surface of the lower traction platform 205 of the coupler body also has the contact area 211a and the avoidance area 211b. Apparently, it is also applicable that only the traction surface of the upper traction platform 201 of the coupler body has the contact area 211a and the avoidance area 211b, and the traction surface of the lower traction platform 205 of the coupler body does not have the contact area 211a and the avoidance area 211b. Or, only the traction surface of the lower traction platform 205 of the coupler body has the contact area 211a and the avoidance area 211b, and the traction surface of the upper traction platform 201 of the coupler body does not have the contact area 211a and the avoidance area 211b.

In a case that each traction surface of the upper traction platform 201 and the lower traction platform 205 of the coupler body is divided into the contact area 211a and the avoidance area 211b along the direction of approaching the lock chamber 209, the avoidance area 211b of the upper traction platform 201 and the avoidance area 211b of the lower traction platform 205 may have same or different shapes. One of the avoidance areas 211b of the upper traction platform 201 and the lower traction platform 205 is a curved surface and the other is a plane. Specifically, the avoidance area 211b of the upper traction platform 201 may be an arc surface, and the avoidance area 211b of the lower traction platform 205 may be a plane, which is not limited here.

Or, in a case that each traction surface of the upper traction platform 201 and the lower traction platform 205 of the coupler body is divided into the contact area 211a and the avoidance area 211b along the direction of approaching the lock chamber 209, the avoidance area 211b of the upper traction platform 201 and the avoidance area 211b of the lower traction platform 205 may be symmetrically arranged.

Specifically, the avoidance area 211b of the upper traction platform 201 and the avoidance area 211b of the lower traction platform 205 may be symmetrically arranged along the horizontal plane, which is not limited here.

The coupler body provided by the embodiment of the present application includes an upper pin-protecting flange 203, an upper impact platform, the upper traction platform 201, a lower pin-protecting flange 207, a lower impact platform, the lower traction platform 205 and the pin hole 204, wherein the pin hole 204 is configured to allow the coupler knuckle pin to pass through. After the coupler knuckle is engaged and hitched with the coupler body, a neck portion 102 of the coupler knuckle is located between the upper traction platform 201 and the lower traction platform 205 of the coupler body, the traction surface of the upper pin-protecting flange 203 of the coupler knuckle cooperates with the traction surface of the upper pin-protecting flange 203 of the coupler body to realize load bearing, and the traction surface of the lower pin-protecting flange of the coupler knuckle cooperates with the traction surface of the lower pin-protecting flange 207 of the coupler body to realize load bearing. Meanwhile, the impact surface of the upper impact platform of the coupler knuckle cooperates with the impact surface of the upper impact platform of the coupler body to realize load bearing, and the impact surface of the lower impact platform of the coupler knuckle cooperates with the impact surface of the lower impact platform of the coupler body to realize load bearing. The traction surface of the upper traction platform 101 of the coupler knuckle cooperates with the traction surface of the upper traction platform 201 of the coupler body to realize load bearing, and the traction surface of the lower traction platform 108 of the coupler knuckle cooperates with the traction surface of the lower traction platform 205 of the coupler body to realize load bearing.

Figure 13:
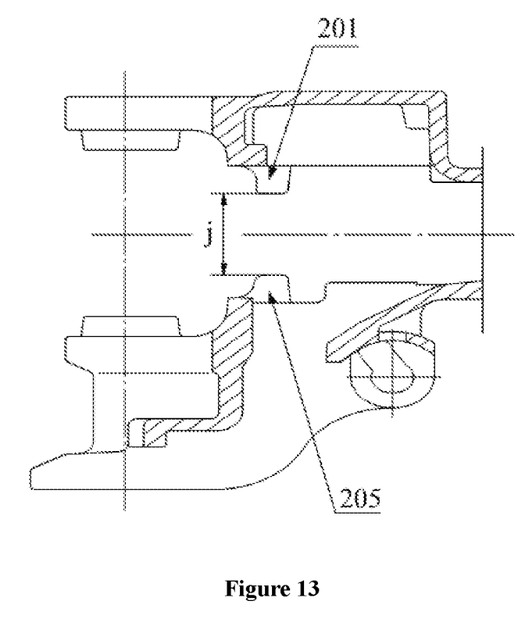
FIG. 13 is a sectional view taken along a vertical plane of the coupler body provided by another embodiment of the present application.
Figure 14:
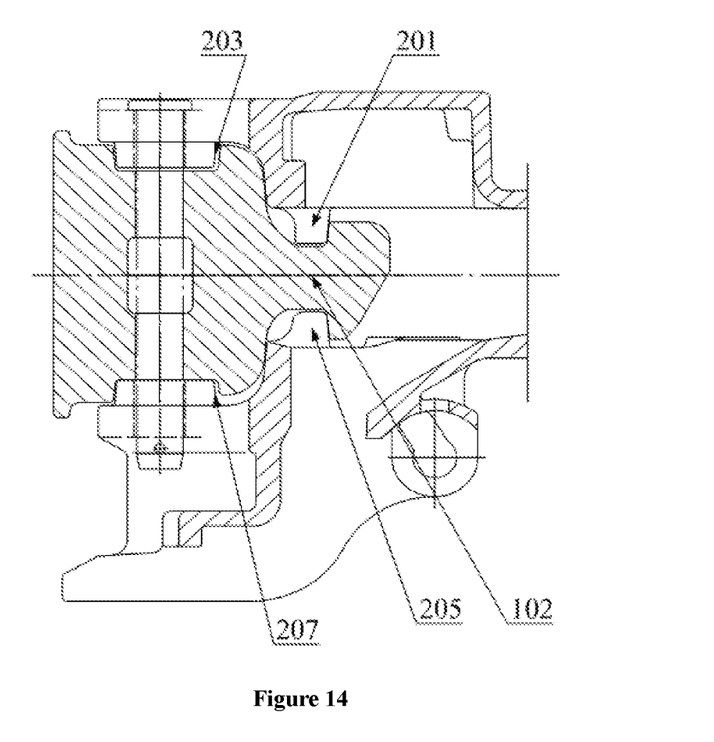
FIG. 14 is a sectional view showing the engagement of the coupler knuckle and the coupler body provided by another embodiment of the present application.

The point is that, a cross section view is taken by cutting the coupler body along a vertical plane perpendicular to a tangent plane of the impact surface of the upper impact platform or along a vertical plane perpendicular to a tangent plane of the traction surface of the upper pin-protecting flange 203, to obtain a section I of the impact surface of the upper impact platform and a section J of the impact surface of the upper pin-protecting flange 203, wherein the minimum horizontal distance between the section I and the section J is defined as f, and 15 mm≤f≤30 mm. The impact surface 202 of the upper impact platform of the coupler body is a curved surface. The vertical plane perpendicular to the tangent plane of the impact surface of the upper impact platform of the coupler body is defined as a fifth vertical plane, and the tangent plane of the impact surface of the upper impact platform may be a tangent plane at any position on the impact surface of the upper impact platform. The traction surface of the upper pin-protecting flange 203 is a curved surface. The vertical plane perpendicular to the tangent plane of the traction surface of the upper pin-protecting flange 203 is defined as a sixth vertical plane, and the tangent plane of the traction surface of the upper pin-protecting flange 203 may be a tangent plane at any position on the traction surface of the upper pin-protecting flange 203. The cross section view is taken by cutting the coupler body along the fifth or sixth vertical plane, to obtain the section I of the impact surface of the upper impact platform and the section J of the impact surface of the upper pin-protecting flange 203. That is, the fifth vertical plane intersects with both the traction surface of the upper pin-protecting flange 203 and the impact surface of the upper impact platform, so that the section I of the impact surface of the upper impact platform and the section J of the impact surface of the upper pin-protecting flange 203 can be obtained simultaneously when the cross section view is taken by cutting the coupler body along the fifth vertical plane. Similarly, the sixth vertical plane intersects with both the traction surface of the upper pin-protecting flange 203 and the impact surface of the upper impact platform, so that the section I of the impact surface of the upper impact platform and the section J of the impact surface of the upper pin-protecting flange 203 can be obtained simultaneously when the cross section view is taken by cutting the coupler body along the sixth vertical plane.

The minimum horizontal distance between the section I and the section J is defined as f, and 15 mm≤f≤30 mm. The minimum horizontal distance is specifically defined as the minimum of the horizontal distances from multiple positions on the section I to the section J. Section I and section J are both lines.

In addition, a cross section view is taken by cutting the coupler body along a vertical plane perpendicular to a tangent plane of the impact surface of the lower impact platform or along a vertical plane perpendicular to a tangent plane of the traction surface of the lower pin-protecting flange 207, to obtain a section K of the impact surface of the lower impact platform and a section M of the impact surface of the lower pin-protecting flange 207, wherein the minimum horizontal distance between the section K and the section M is defined as g, and 15 mm≤g≤30 mm. The impact surface 206 of the lower impact platform of the coupler body is a curved surface. The vertical plane perpendicular to the tangent plane of the impact surface of the upper impact platform of the coupler body is defined as a seventh vertical plane, and the tangent plane of the impact surface of the lower impact platform may be a tangent plane at any position on the impact surface of the lower impact platform. The traction surface of the lower pin-protecting flange 207 is a curved surface. The vertical plane perpendicular to the tangent plane of the traction surface of the lower pin-protecting flange 207 is defined as an eighth vertical plane, and the tangent plane of the traction surface of the lower pin-protecting flange 207 may be a tangent plane at any position on the traction surface of the lower pin-protecting flange 207. The cross section view is taken by cutting the coupler body along the seventh or eighth vertical plane, to obtain the section K of the impact surface of the lower impact platform and the section M of the impact surface of the lower pin-protecting flange 207. That is, the seventh vertical plane intersects with both the traction surface of the lower pin-protecting flange 207 and the impact surface of the lower impact platform, so that the section K of the impact surface of the lower impact platform and the section M of the impact surface of the lower pin-protecting flange 207 can be obtained simultaneously when the cross section view is taken by cutting the coupler body along the seventh vertical plane. Similarly, the eighth vertical plane intersects with both the traction surface of the lower pin-protecting flange 207 and the impact surface of the lower impact platform, so that the section K of the impact surface of the lower impact platform and the section M of the impact surface of the lower pin-protecting flange 207 can be obtained simultaneously when the cross section view is taken by cutting the coupler body along the sixth vertical plane.

The minimum horizontal distance between the section K and the section M is defined as g, and 15 mm≤g≤30 mm. The minimum horizontal distance is specifically defined as the minimum of the horizontal distances from multiple positions on the section K to the section M. Section K and section M are both lines.

In the coupler body provided by the embodiment of the present application, the distance between the impact platform and the pin-protecting flange is kept between 15 mm and 30 mm by adjusting the structure of the impact platform and the pin-protecting flange of the coupler body, which improves the structural strength of the pin-protecting flange of the coupler body, increases the distance between the impact platform and the traction platform, makes the transition between the impact platform and the traction platform smooth, reduces stress concentration and improves strength, and avoids the problem that the pin-protecting flange of the coupler knuckle and the transition zone between the impact platform and the traction platform break prematurely, thereby prolonging the service life of the coupler knuckle and reducing the maintenance cost of the coupler.

In the coupler body, preferably, a cross section view is taken by cutting the coupler body along a vertical plane perpendicular to a tangent plane of an inner wall of the pin hole 204 or along a vertical plane perpendicular to the tangent plane of the traction surface of the upper pin-protecting flange 203, to obtain a section N of the inner wall of the pin hole 204 and a section O of the impact surface of the upper pin-protecting flange 203, wherein the minimum horizontal distance between the section N and the section O is defined as h, and 15 mm≤h≤30 mm. That is, in this embodiment, the inner wall of the pin hole 204 of the coupler body is a cylindrical surface. The vertical plane perpendicular to the tangent plane of the inner wall of the pin hole 204 of the coupler body is defined as a thirteenth vertical plane, and the tangent plane of the inner wall of the pin hole 204 may be a tangent plane at any position on the inner wall of the pin hole 204. The traction surface of the upper pin-protecting flange 203 is a curved surface. The vertical plane perpendicular to the tangent plane of the traction surface of the upper pin-protecting flange 203 is defined as a fourteenth vertical plane, and the tangent plane of the traction surface of the upper pin-protecting flange 203 may be a tangent plane at any position on the traction surface of the upper pin-protecting flange 203. The cross section view is taken by cutting the coupler body along the thirteenth or fourteenth vertical plane to obtain the section N of the inner wall of the pin hole 204 and the section O of the impact surface of the upper pin-protecting flange 203. That is, the thirteenth vertical plane intersects with both the traction surface of the upper pin-protecting flange 203 and the inner wall of the pin hole 204, so that the section N of the inner wall of the pin hole 204 and the section O of the impact surface of the upper pin-protecting flange 203 can be obtained simultaneously when the cross section view is taken by cutting the coupler body along the thirteenth vertical plane. Similarly, the thirteenth vertical plane intersects with both the traction surface of the upper pin-protecting flange 203 and the inner wall of the pin hole 204, so that the section N of the inner wall of the pin hole 204 and the section O of the impact surface of the upper pin-protecting flange 203 can be obtained simultaneously when the cross section view is taken by cutting the coupler body along the thirteenth vertical plane.

The minimum horizontal distance between the section N and the section O is defined as h, and 15 mm≤h≤30 mm. The minimum horizontal distance is specifically defined as the minimum of the horizontal distances from multiple positions on the section N to the section O. Section N and section O are both lines.

In addition, it is also applicable to take a cross section view by cutting the coupler body along a vertical plane perpendicular to the tangent plane of the inner wall of the pin hole 204 or along a vertical plane perpendicular to the tangent plane of the traction surface of the lower pin-protecting flange 207, to obtain a section P of the inner wall of the pin hole 204 and a section Q of the impact surface of the lower pin-protecting flange 207, wherein the minimum horizontal distance between the section P and the section Q is defined as i, and 15 mm≤i≤30 mm. That is, in this embodiment, the inner wall of the pin hole 204 of the coupler body is a cylindrical surface. The vertical plane perpendicular to the tangent plane of the inner wall of the pin hole 204 of the coupler body is defined as a fifteenth vertical plane, and the tangent plane of the inner wall of the pin hole 204 may be a tangent plane at any position on the inner wall of the pin hole 204. The traction surface of the lower pin-protecting flange 207 is a curved surface. The vertical plane perpendicular to the tangent plane of the traction surface of the lower pin-protecting flange 207 is defined as a sixteenth vertical plane, and the tangent plane of the traction surface of the lower pin-protecting flange 207 may be a tangent plane at any position on the traction surface of the lower pin-protecting flange 207. The cross section view is taken by cutting the coupler body along the fifteenth or sixteenth vertical plane to obtain the section P of the inner wall of the pin hole 204 and the section Q of the impact surface of the upper pin-protecting flange 203. That is, the fifteenth vertical plane intersects with both the traction surface of the lower pin-protecting flange 207 and the inner wall of the pin hole 204, so that the section P of the inner wall of the pin hole 204 and the section Q of the impact surface of the lower pin-protecting flange 207 can be obtained simultaneously when the cross section view is taken by cutting the coupler body along the fifteenth vertical plane. Similarly, the sixteenth vertical plane intersects with both the traction surface of the lower pin-protecting flange 207 and the inner wall of the pin hole 204 so that the section P of the inner wall of the pin hole 204 and the section Q of the impact surface of the lower pin-protecting flange 207 can be obtained simultaneously when the cross section view is taken by cutting the coupler body along the sixteenth vertical plane.

The minimum horizontal distance between the section P and the section Q is defined as i, and 15 mm≤i≤30 mm. The minimum horizontal distance is specifically defined as the minimum of the horizontal distances from multiple positions on the section P to the section Q. Section P and section Q are both lines.

With this arrangement, the distance between the pin-protecting flange structure of the coupler body and the pin hole 204 is kept between 15 mm and 30 mm, which improves the structural strength of the pin-protecting flange, reduces the distance between the impact platform and the traction platform compared with the prior art, makes the structure moderate, improves the structural strength of the pin-protecting flange and the traction platform of the coupler body, and avoids premature fracture.

In another embodiment, the minimum extension distance between the upper traction platform 201 and the lower traction platform 205 of the coupler body in the vertical direction is defined as j, and j≥120 mm. That is, the extension distance in the vertical direction between the lowermost point of the upper traction platform 201 and the uppermost point of the lower traction platform 205 is defined as j. With this arrangement, the height of the neck portion 102 of the coupler knuckle can be further increased by adjusting the structure of the coupler body cooperating with the neck portion 102 of the coupler knuckle, which can reduce the stress level of the neck portion 102 of the coupler knuckle and increase the overall structural strength of the neck portion 102 of the coupler knuckle.

In an embodiment, the impact surface of the upper impact platform of the coupler body and the traction surface of the upper pin-protecting flange 203 of the coupler body may both be arc surfaces, wherein the traction surface of the upper pin-protecting flange 203 of the coupler body may include multiple arc surfaces which are not on a same cylindrical surface. Similarly, the impact surface of the lower impact platform of the coupler body and the traction surface of the lower pin-protecting flange 207 of the coupler body may both be arc surfaces, wherein the traction surface of the lower pin-protecting flange 207 of the coupler body may include multiple arc surfaces which are not on a same cylindrical surface.

Based on the coupler body provided in the above embodiments, a coupler is further provided according to the present application, which includes a coupler knuckle and a coupler body, wherein the coupler body is the coupler body described in any of the above embodiments. Since the coupler body according to the above embodiments is adopted in the coupler, the coupler has the same beneficial effect as the coupler body according to the above embodiments.

In addition, a railway vehicle is further provided according to the present application, which includes the above coupler. Therefore, the railway vehicle has the same beneficial effect as the coupler body according to the above embodiments.

In the present specification, the embodiments are described in a progressive manner. Each embodiment mainly focuses on an aspect different from other embodiments, and reference can be made to these similar parts among the embodiments.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Hence, the present application is not limited to the embodiments disclosed herein, but is to conform to the widest scope in accordance with the principles and novel features disclosed herein.

The invention claimed is:

1. A coupler body, comprising an upper traction platform, a lower traction platform, a lock chamber and a pin hole, wherein a traction surface of the upper traction platform and/or the lower traction platform is divided into a contact area and an avoidance area, wherein the avoidance area is closer to the lock chamber than the contact area an extension surface of one end of the contact area close to the lock chamber is defined as M2, and the avoidance area is located on one side of the M2 surface close to the pin hole; and
the avoidance area is an inner wall of a groove provided on the traction surface of the upper traction platform and/or the lower traction platform.

2. The coupler body according to claim 1, wherein a first end of the avoidance area is connected with the contact area and a second end of the avoidance area is far away from the contact area, a direction from left to right and perpendicular to an axis of the pin hole is defined as a first extension direction, a front side of the coupler body is configured to engage with a coupler knuckle, an extension distance from the first end to the second end of the avoidance area along the first extension direction is defined as L2, and 60 mm>L2>10 mm.

3. The coupler body according to claim 1, wherein the contact area is a curved surface.

4. The coupler body according to claim 1, wherein the contact area is an arc surface and protrudes away from the pin hole.

5. The coupler body according to claim 1, wherein the avoidance area is a curved surface.

6. The coupler body according to claim 1, wherein a section I of an impact surface of an upper impact platform and a section J of an impact surface of an upper pin-protecting flange are obtained by taking a cross section view by cutting a coupler knuckle along a vertical plane perpendicular to a tangent plane of the impact surface of the upper impact platform or along a vertical plane perpendicular to a tangent plane of the traction surface of the upper pin-protecting flange of the coupler body, a minimum horizontal distance between the section I and the section J is defined as f, and 15 mm≤f≤30 mm; and/or,
a section K of an impact surface of a lower impact platform and a section M of an impact surface of a lower pin-protecting flange are obtained by taking a cross section view by cutting the coupler knuckle along a vertical plane perpendicular to a tangent plane of the impact surface of the lower impact platform or along a vertical plane perpendicular to a tangent plane of a traction surface of the lower pin-protecting flange of the coupler body, a minimum horizontal distance between the section K and the section M is defined as g, and 15 mm≤g≤30 mm.

7. The coupler body according to claim 6, wherein a section N of an inner wall of the pin hole and a section O of the impact surface of the upper pin-protecting flange are obtained by taking a cross section view by cutting the coupler knuckle along a vertical plane perpendicular to a tangent plane of the inner wall of the pin hole or along a vertical plane perpendicular to a tangent plane of the traction surface of the upper pin-protecting flange, a minimum horizontal distance between the section N and the section O is defined as h, and 15 mm≤h≤30 mm; and/or,
a section P of the inner wall of the pin hole and a section Q of the impact surface of the lower pin-protecting flange are obtained by taking a cross section view by cutting the coupler knuckle along a vertical plane perpendicular to the tangent plane of the inner wall of the pin hole or along a vertical plane perpendicular to the tangent plane of the traction surface of the lower pin-protecting flange, a minimum horizontal distance between the section P and the section Q is defined as i, and 15 mm≤i≤30 mm.

8. A coupler, comprising a coupler knuckle and a coupler body,
wherein the coupler body is the coupler body according to any one of claim 1.

9. A railway vehicle comprising a coupler, wherein the coupler is the coupler according to claim 8.

* * * * *